US012662265B2

(12) United States Patent　　　　(10) Patent No.:　US 12,662,265 B2

Velazquez et al.　　　　　　　　　　　(45) Date of Patent:　Jun. 23, 2026

(54) MODULAR ROTORCRAFT AND SYSTEM FOR AIR-DELIVERED EFFECTS OR SENSOR PAYLOADS

(71) Applicant: Textron Systems Coporation, Hunt Valley, MD (US)

(72) Inventors: Matthew T. Velazquez, Mount Airy, MD (US); James Gard Blonde, Baltimore, MD (US); Brian Reissner Caskey, Cockeysville, MD (US); Sean Marshall Baity, Westminster, MD (US)

(73) Assignee: TEXTRON SYSTEMS CORPORATION, Hunt Valley, MD (US)

( * ) Notice: Subject to any disclaimer, the term of this patent is extended or adjusted under 35 U.S.C. 154(b) by 809 days.

(21) Appl. No.: 17/973,660

(22) Filed: Oct. 26, 2022

(65) Prior Publication Data

US 2025/0361041 A1　　Nov. 27, 2025

Related U.S. Application Data

(60) Provisional application No. 63/272,398, filed on Oct. 27, 2021.

(51) Int. Cl.
　B64U 20/80　　　(2023.01)
　B64U 10/14　　　(2023.01)
　　　　(Continued)
(52) U.S. Cl.
　CPC ............. B64U 20/80 (2023.01); B64U 10/14 (2023.01); B64U 20/50 (2023.01); B64U 30/293 (2023.01);
　　　　(Continued)

(58) Field of Classification Search
　CPC ........ B64U 20/80; B64U 10/14; B64U 20/50; B64U 30/293; B64U 50/18; B64U 50/34; B64U 2201/102; B64U 2201/104
　See application file for complete search history.

(56) References Cited

U.S. PATENT DOCUMENTS 3,978,790 A * 9/1976 Sandelius ............... F42B 10/14
　　　　　　　　　　　　　　　102/388
6,723,972 B2 * 4/2004 Schroeder ............... F02K 1/008
　　　　　　　　　　　　　　　244/3.24
(Continued)

FOREIGN PATENT DOCUMENTS

GB　　　　2584817 A　　12/2020

*Primary Examiner* — Medhat Badawi
(74) *Attorney, Agent, or Firm* — BainwoodHuang

(57) ABSTRACT

A tactically deployable rotorcraft for targeted delivery of effects and/or sensors includes a body housing an energy subsystem, a control and communications subsystem, and a modular payload compartment for holding an effect or sensor payload, the body having a generally cylindrical outline and a plurality of arm-rotor niches therein. Arm-rotor assemblies are pivotably mounted to the body, each including an articulating arm and a rotor at a distal end, and each being pivotable between (1) a closed position in a corresponding arm-rotor niche within the outline of the body, and (2) an open position extending from the body with the rotor facing in a flight direction. The rotors are powered by the energy subsystem and controlled by the control and communications subsystem to provide powered flight to a target location for delivery of the effect or sensor payload.

18 Claims, 7 Drawing Sheets

(51) Int. Cl.
    *B64U 20/50*     (2023.01)
    *B64U 30/293*     (2023.01)
    *B64U 50/18*     (2023.01)
    *B64U 50/34*     (2023.01)

(52) U.S. Cl.
    CPC ............. *B64U 50/18* (2023.01); *B64U 50/34* (2023.01); *B64U 2201/102* (2023.01); *B64U 2201/104* (2023.01)

(56)       References Cited

U.S. PATENT DOCUMENTS

| | | | |
|---|---|---|---|
| 7,510,142 B2 | 3/2009 | Johnson | |
| 7,789,341 B2 | 9/2010 | Arlton et al. | |
| 7,793,606 B2 * | 9/2010 | Olivier ................. | G01V 1/3826 |
| | | | 244/3.28 |
| 8,083,173 B2 | 12/2011 | Arlton et al. | |
| 8,115,149 B1 * | 2/2012 | Manole ................... | F42B 10/18 |
| | | | 244/45 R |
| 8,552,351 B2 * | 10/2013 | Geswender ............ | F42B 10/64 |
| | | | 244/3.27 |
| 9,527,588 B1 * | 12/2016 | Rollefstad .............. | B64U 10/13 |
| 9,738,380 B2 * | 8/2017 | Claridge ................... | G08G 5/80 |
| 9,969,491 B2 | 5/2018 | Strayer | |
| 10,065,726 B1 * | 9/2018 | Phan ...................... | B64D 17/80 |
| 10,093,417 B2 | 10/2018 | Meringer et al. | |
| 10,106,252 B1 | 10/2018 | Tearne et al. | |
| 10,279,898 B2 | 5/2019 | Green et al. | |
| 10,392,104 B1 * | 8/2019 | Urban .................. | B64U 30/293 |
| 10,479,499 B2 * | 11/2019 | Newman ................. | B64C 27/50 |
| 10,486,830 B2 * | 11/2019 | Kahlon ................... | B64U 70/50 |
| 10,549,850 B1 * | 2/2020 | Ryan ...................... | B64U 20/50 |
| 10,685,404 B1 * | 6/2020 | Tofte ...................... | G01C 11/02 |
| 10,717,526 B2 | 7/2020 | Hefner et al. | |
| 10,752,334 B2 | 8/2020 | Chow | |
| 10,814,979 B2 | 10/2020 | Crowder | |
| 10,946,956 B2 | 3/2021 | Campbell | |
| 11,040,772 B2 * | 6/2021 | Reddy .................... | B64U 70/50 |
| 11,636,447 B1 * | 4/2023 | Mishra ................... | G07C 5/006 |
| | | | 705/305 |
| 11,667,398 B2 * | 6/2023 | von Flotow ........... | B64U 10/50 |
| | | | 244/63 |
| 11,702,202 B1 * | 7/2023 | Anderson ............... | B64C 27/33 |
| | | | 244/17.23 |
| 11,780,580 B2 * | 10/2023 | Izraelevitz ............. | B64U 30/20 |
| | | | 244/3.16 |
| 11,794,931 B2 * | 10/2023 | Gil .......................... | B64U 20/40 |
| 12,202,625 B2 * | 1/2025 | Kempley ............... | B64U 10/14 |
| 2005/0051667 A1 * | 3/2005 | Arlton .............. | G08B 13/19621 |
| | | | 244/17.11 |
| 2005/0274845 A1 * | 12/2005 | Miller .................... | B64U 30/12 |
| | | | 244/49 |
| 2006/0011777 A1 * | 1/2006 | Arlton .................... | B64U 10/17 |
| | | | 244/7 B |
| 2007/0125904 A1 * | 6/2007 | Janka ..................... | F42B 10/14 |
| | | | 244/3.28 |

| | | | |
|---|---|---|---|
| 2009/0302151 A1 * | 12/2009 | Holmes .................... | B64C 3/56 |
| | | | 244/49 |
| 2010/0264260 A1 * | 10/2010 | Hammerquist .......... | B64C 3/56 |
| | | | 244/49 |
| 2011/0155840 A1 * | 6/2011 | Lind, Jr. ................ | B64U 30/12 |
| | | | 244/17.11 |
| 2012/0068002 A1 * | 3/2012 | Unger .................... | F42B 10/64 |
| | | | 244/3.28 |
| 2012/0267473 A1 * | 10/2012 | Tao ........................ | B64U 40/10 |
| | | | 244/46 |
| 2014/0008483 A1 * | 1/2014 | Valledor ................ | F42B 10/06 |
| | | | 244/3.27 |
| 2014/0131510 A1 * | 5/2014 | Wang ..................... | B64D 31/14 |
| | | | 244/17.23 |
| 2014/0299708 A1 * | 10/2014 | Green ..................... | B64C 27/50 |
| | | | 244/17.11 |
| 2015/0245516 A1 * | 8/2015 | Christensen ........... | B64U 20/80 |
| | | | 361/752 |
| 2016/0046372 A1 * | 2/2016 | Barnes ................... | B64U 10/14 |
| | | | 244/17.19 |
| 2016/0272317 A1 * | 9/2016 | Cho ....................... | G08G 1/162 |
| 2016/0293015 A1 * | 10/2016 | Bragin ................. | B64U 30/293 |
| 2016/0376004 A1 * | 12/2016 | Claridge ................ | B64C 19/00 |
| | | | 701/3 |
| 2017/0043870 A1 * | 2/2017 | Wu ....................... | B64U 30/291 |
| 2018/0093753 A1 * | 4/2018 | Chow ................... | B64F 1/06 |
| 2018/0111682 A1 * | 4/2018 | Kim ...................... | B64D 19/02 |
| 2018/0148168 A1 * | 5/2018 | Newman ............. | B64U 30/293 |
| 2018/0170510 A1 * | 6/2018 | Brock ................... | B64U 50/19 |
| 2018/0170539 A1 * | 6/2018 | Claridge ............... | A63H 27/12 |
| 2018/0201356 A1 * | 7/2018 | Cai ........................ | B64U 10/13 |
| 2018/0257769 A1 * | 9/2018 | Goldstein .............. | B64C 27/50 |
| 2018/0281939 A1 * | 10/2018 | Tayman ................. | B64U 30/24 |
| 2018/0327092 A1 * | 11/2018 | Deng .................... | B64C 39/024 |
| 2019/0002094 A1 * | 1/2019 | Wang .................... | B64D 31/14 |
| 2019/0077503 A1 * | 3/2019 | Reddy .................... | F41G 3/145 |
| 2019/0092466 A1 | 3/2019 | Meringer et al. | |
| 2020/0033104 A1 * | 1/2020 | Garst ...................... | F42B 12/62 |
| 2020/0164971 A1 * | 5/2020 | Wang ..................... | B64D 43/00 |
| 2021/0053675 A1 * | 2/2021 | Agronov .............. | B64U 30/297 |
| 2021/0107645 A1 * | 4/2021 | Izraelevitz .............. | F42B 15/08 |
| 2021/0107652 A1 * | 4/2021 | Velazquez .......... | B64C 29/0033 |
| 2021/0214067 A1 * | 7/2021 | West .................... | B64U 30/293 |
| 2022/0185501 A1 * | 6/2022 | Kempley ............. | B64U 70/70 |
| 2022/0388653 A1 * | 12/2022 | Kuperman ........... | B64U 30/293 |
| 2022/0392672 A1 * | 12/2022 | Getman ............. | A61H 23/0218 |
| 2023/0097186 A1 * | 3/2023 | Johannesson .......... | B64U 10/70 |
| | | | 244/108 |
| 2023/0106432 A1 * | 4/2023 | Baumgartner ......... | G05D 1/221 |
| | | | 701/2 |
| 2023/0118521 A1 * | 4/2023 | Woodman .............. | B64U 20/50 |
| | | | 244/55 |
| 2023/0249849 A1 * | 8/2023 | Luong ................... | B64U 20/50 |
| | | | 89/27.11 |
| 2024/0067371 A1 * | 2/2024 | Turner .................. | B64U 50/37 |
| 2024/0101286 A1 * | 3/2024 | Regev ................... | B64U 70/20 |

* cited by examiner

MODULAR ROTORCRAFT AND SYSTEM FOR AIR-DELIVERED EFFECTS OR SENSOR PAYLOADS

BACKGROUND

This invention is generally in the field of unmanned aircraft, and it relates specifically to propulsion and controls for coordinated robotic delivery of modular effects and/or sensors.

Known rotorcraft configurations include Fixed Co-axial Rotor, Vectored Co-Axial Rotor, and Fixed-Arm Multirotor.

Fixed Co-Axial Rotor configurations implement co-axial, counter rotating rotors installed along the vertical axis of a cylindrical/elongated prismatic aircraft fuselage. Collective control provided by variable control of counter rotating rotor speed via electronic speed controllers. Cyclic control using servo actuated linkage assemblies that adjust the pitch of one or both of rotor assemblies. Rotor assembly delivers thrust <1 compared to two separate rotor discs. Requires complexity and failure point of servo linkages. Magnitude of "tilting" moment limited to a lever arm within radius the rotor disc which limits the ability to adequately position the aircraft fuselage relative to an intended aim point with lower center of gravity configurations.

Vectored Co-Axial Rotor configurations implement co-axial, counter rotating rotors installed along the vertical axis of a cylindrical/elongated prismatic aircraft fuselage with one or more of the rotor assemblies having the ability to adjust the relative angular position of the rotor axis to the fuselage using servo actuated control. Provides a significant increase in maneuver moment compared to fixed co-axial implementations but adds complexity to the mechanical implementation to gimbal/servo each rotor.

Fixed Arm Multi-Rotor configurations utilize multiple rotors fixedly arranged around a fuselage, providing greater thrust-to-weight scalability. Ability to position the multi-rotors at greater relative distance to the fuselage enables increased maneuver moment compared to co-axial implementations. Rotor assemblies do not require the added complexity of cyclic pitch or vectored title control required for coaxial implementations. Fixed-arm configurations typically have a sizeable horizontal extent to provide required separation among the rotors.

SUMMARY

A light weight and compact unmanned-aircraft effect-delivery platform conforms to cylindrical form factor while in a transport or ready state and implements a multi-rotor topology to provide thrust-to-weight and body maneuver control authority greater than co-axial rotor topologies. The aircraft implements folding multi-rotor topology without the need for size, weight, power, and part count related to active rotor extension. Rotor arm extension enables the rotors to achieve deliberate relative orientation to the aircraft center body and other rotors to achieve stable multi-rotor flight. Rotor arrangement when extended/deployed provides a fixed proportion of laterally vectored thrust enabling translation with reduced body-angle tilt mitigating dynamic response through the use of a flight guidance, navigation, and control computer system.

More specifically, in one aspect a tactically deployable rotorcraft is disclosed for targeted delivery of effects and/or sensors. The rotorcraft includes a body housing an energy subsystem, a control and communications subsystem, and a modular payload compartment for holding an effect or sensor payload, the body having a generally cylindrical outline and a plurality of arm-rotor niches therein. The rotorcraft further includes a plurality of arm-rotor assemblies pivotably mounted to the body, each arm-rotor assembly including an articulating arm and a rotor at a distal end thereof, each arm-rotor assembly being pivotable between (1) a closed position in a corresponding arm-rotor niche and within the generally cylindrical outline of the body, and (2) an open position extending from the body with the rotor facing in a flight direction, the rotors being powered by the energy subsystem and controlled by the control and communications subsystem to provide powered flight of the rotorcraft to a target location for delivery of the effect or sensor payload.

In another aspect, a system is disclosed for targeted delivery of effects and/or sensors, the system including a plurality of tactically deployable rotorcraft each having an energy subsystem, a control and communications subsystem, a payload compartment for holding an effect or sensor payload, and a plurality of arm-rotor assemblies mounted to the body to present respective rotors in a flight orientation for powered flight of the rotorcraft. A system controller is co-configured and co-operable with the control and communications subsystems of each agent rotorcraft to provide for automated and coordinated tailoring of the thrust-vector maneuvering of the rotorcrafts from respective deployment positions to respective intermediate staging and subsequent target positions and coordinated delivery of the equipped effects and/or sensors thereat.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

DETAILED DESCRIPTION

Overview

Figure 1:
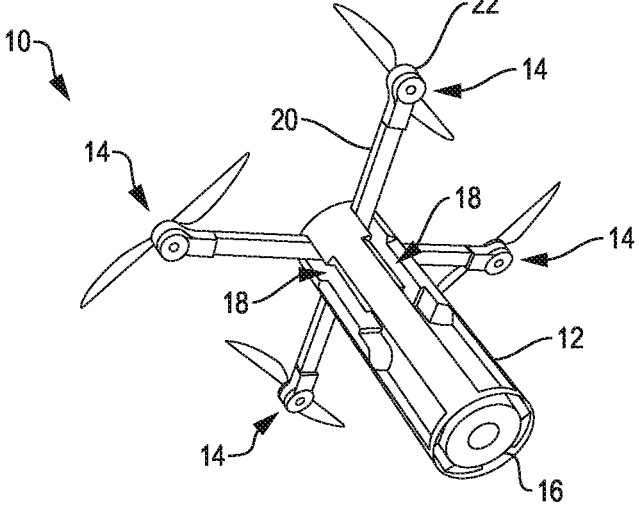
FIG. 1 is an isometric view of a rotorcraft according to a first embodiment.

Generally, the disclosure describes light weight and compact unmanned aircraft effect delivery platform which conforms to a cylindrical form factor while in a transport or ready state and implements a multi-rotor topology to provide thrust-to-weight and body maneuver control authority greater than co-axial rotor topologies. The aircraft utilizes folding multi-rotor topology without the need for size, weight, power, and part count related to active rotor extension. Rotor arm extension enables the rotors to achieve deliberate relative orientation to the aircraft center body and other rotors to achieve stable multi-rotor flight. Rotor arrangement when extended/deployed provides a fixed proportion of laterally vectored thrust enabling translation with reduced body-angle tilt mitigating dynamic response through the use of a flight guidance, navigation, and control computer system.

In one embodiment the invention is an unmanned aircraft (rotorcraft) agent employing multiple rotor assemblies which are installed on articulating arms that are stowed in a folded state. The arms are retained in place through either passive or active retention mechanisms that restrain the arms in the stowed configuration until the agent initiates a transition to flight. Example passive restraints include single elements such as spring detents, shear elements, thin film wrap, string, wire, or similar mechanism with a deterministic retention force. Example active restraints include solenoid actuated pins, clasps, clips, or similar mechanisms that positively retain the arms in stowed position until actively commanded by onboard controller logic to release. The arms extend radially outward from the aircraft fuselage upon the controlled initiation of thrust by the onboard controller. Rotor arm extension is achieved through spring assist, the commanded application of thrust to each rotor, or the combination of both. Once at the maximum angle of extension, the rotors are oriented relative to the center body of the aircraft in manner to deliver thrust both vertically and laterally enabling the ability to translate with reduced center body tilt. Deployed orientation is achieved at a fixed position by means of the kinematic extension of the rotor support arms. Two or more pairs of counter rotating pairs of extended rotors constitute a multi-rotor propulsion system providing the ability to conduct controlled remote or autonomous flight. An onboard flight management controller coordinates the thrust driven extension of the arms in an orchestrated manner to maintain aircraft static and dynamic stability, execute the transition of the vehicle to free-flight modes from either a static (i.e. ground) or dynamic (i.e. moving vehicle) launch/take-off initial condition.

The aircraft includes propulsion elements to implement aerodynamic rotor control including energy storage (batteries), distribution, and control. The power control system includes power management enabling power conservation for extended periods of persistence and includes features providing utilization of power scavenging techniques including photo-voltaic, electro-magnetic induction, vibration, and thermal energy.

The aircraft is equipped with a payload subsystem that includes mission processor subsystems providing perception, control, communications, and processing enabling the aircraft to conduct obstacle detection and avoidance, path planning and navigation, in situ feature and context extraction, targeting, and induvial and multi-agent collaborative autonomous behaviors.

The mission processor implements a containerized microservice architecture enabling the integration of diverse software capabilities on a common computer and graphics processing embedded system on module. Component microservices operate on common hardware but implement self-contained and service unique software components, operating systems and interfaces. Interfaces between heterogenous containerized micro-services are implemented through the application of Interface Definition Languages (IDL) methods that enable deterministic data exchange and focused bridging to native service protocols and data types.

The payload subsystem includes payload controller subsystem designed to provide persistent multi-modal observation while in a deployed operational but static (non-flight) state using one or more sensing modalities. The payload controller subsystem is powered by the vehicle primary power storage element (batteries) enables low power operation sensors while aircraft flight and propulsion system, mission processor, full motion video sensors, and long-haul command and control datalinks remain in a quiescent state thereby conserving available power. Once defined payload controller sensing criteria is met, the payload controller initiates power on of the aircraft system, mission processor, and long-haul datalinks to transition to a more active state of operation that demands additional energy. The payload controller can return the system to a low-power mode if logic within the mission processor initiates the return to a quiescent state.

The aircraft and payload subsystems include a modular mission payload effector/sensor capability that enables equipage of unique payload capabilities without physical modification to the base aircraft propulsion, control, communications, and processing. Based on the installed modular effect or sensing system, the payload controller directs selective adaptation of the flight, mission, and autonomy services to adapt to specifically equipped effect or sensor capabilities.

The aircraft control system is designed to work in concert with other instances of the aircraft (agents) as teams (agent groups). Each team (agent group) is composed of aircraft (agents) equipped with either homogenous or heterogeneous effect/payload capabilities. The command and control subsystem implement interfaces and vehicle-to-vehicle networking communications to enable cooperative behaviors (i.e. teams or swarms) by developing a shared world model/ operating picture, and implement distributed tasking in alignment with prescribed tactics, techniques, and procedures specific to the mission objective with or without human agent oversight. Each aircraft (agent) employs a one or more mobile ad-hoc networking communication links that enable selective and scalable communications to support low-power and high-power modes of operation over short and long distance between aircraft (agents) and teams (agent groups).

In one specific example, a multirotor vehicle (rotorcraft) includes:

(a) a central body frame (body), segmented to accommodate modular functionality and configuration including;
   (i) compartmentalized kinetic and/or non-kinetic effects;
   (ii) energy storage, distribution, and control of propulsion systems;

(iii) compute resources including mission and payload sensor processing, guidance, navigation, control, and communications; and (iv) multi-modal communications systems enabling remote tasking and vehicle-to-vehicle information exchange;

(b) two or more foldable arms (arm-rotor assemblies), wherein:

(i) each foldable arm is attached to the central body frame via a hinge;

(ii) the foldable arms exist in two states:

(1) a closed state wherein the foldable arms are parallel to a central body axis of the central body frame; and (2) an open state wherein the foldable arms extend radially outward perpendicular to the central body axis;

(iii) the foldable arms transition from the closed state to the open state subsequent to launch;

(iv) the foldable arms complete compound angular kinematic motion during extension from closed to open states;

(v) the resulting open state position of the rotors is set at fixed pose relative the center body and coordinated pairs of rotor assembles; and (vi) the resulting relative position of the rotors reflects a thrust vector that is at a fixed angular offset to the center-body in at least one degree of freedom;

(c) a rotor mounted to each of the three of more foldable arms, wherein the rotors are controlled by a motor, and flight management system computer to enable flight, wherein:

(i) the rotor in the closed state is designed to reside wholly within the cross-section of the central body frame; and (ii) the central body frame includes features which physically interact with the rotor surface to initiate state transition upon the application of powered rotor axial motion;

(d) the flight management system state transition between foldable arm closed state and open state is initiated by the controlled and orchestrated application of thrust; and (e) the vehicle is capable of initiating flight from a closed state while the central body is inertially:

(i) static; or (ii) dynamic.

EMBODIMENTS

Figures 2, 3:
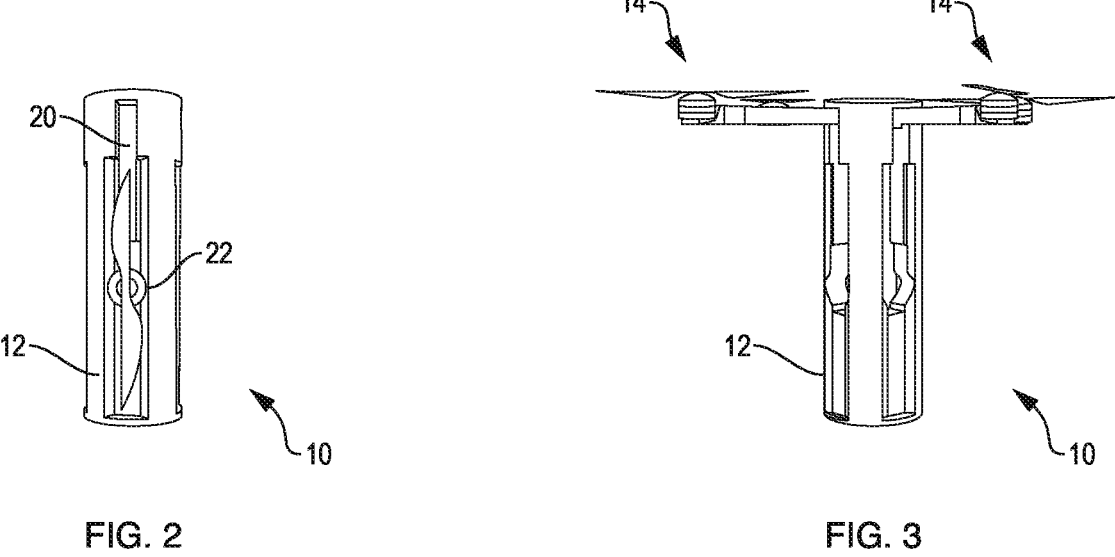
FIG. 2 is a side view of the rotorcraft of FIG. 1 in a non-deployed stowed state with rotor arms folded.
FIG. 3 is a side view of the rotorcraft of FIG. 1 in a deployed state with rotor arms extended for flight.

FIGS. 1-3 show a tactically deployable rotorcraft 10 usable for targeted delivery of effects and/or sensors. The rotorcraft 10 includes a body 12 and a plurality of arm-rotor assemblies 14 pivotably mounted to the body 12. As described in more detail below, the body 12 typically houses at least an energy subsystem and a control and communications subsystem, as well as a payload compartment for holding mission computing, sensors, and an effect or sensor payload. In FIG. 1, such an effect payload 16 is visible at the bottom of the body 12. The body 12 has a generally cylindrical outline or envelope (e.g., circular cross section in this example) and a plurality of arm-rotor niches 18 in which the arm-rotor assemblies 14 reside when the rotorcraft 10 is in a closed or stowed configuration. Each arm-rotor assembly 14 includes an articulating arm 20 and a rotor 22 at a distal end thereof, and is pivotable between (1) a closed (stowed) position in a corresponding arm-rotor niche 18 within the outline or envelop of the body 12 (see FIG. 2), and (2) an open (deployed) position extending from the body 12 with the rotor 22 oriented for controlled and stable flight at relative angular offset to both the body 12 and other coordinated rotors 22 (see FIGS. 1 and 3). The rotors 22 are powered by the internal energy subsystem and controlled by the internal control and communications subsystem to provide powered flight of the rotorcraft 10 to a target location for delivery of the effect or sensor payload.

Figure 4:
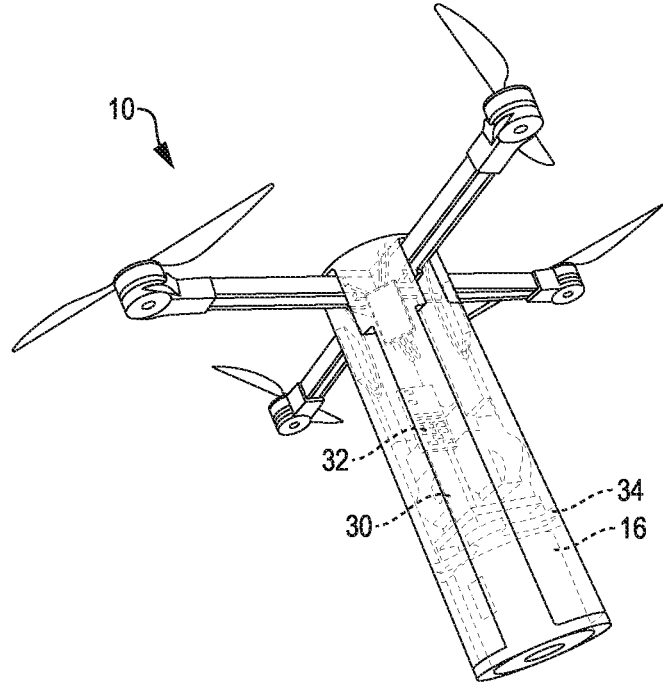
FIG. 4 is an isometric view of the rotor craft of FIG. 1 with fuselage rendered transparent to reveal internal components.

FIG. 4 shows the rotorcraft 10 with body in phantom to reveal internal components, which include the effect payload 16, batteries 30, inertial navigation (INS) 32, and mission computer and sensors 34. In this arrangement the batteries 30 and associated circuitry make up the internal energy system that powers flight and other internal subsystems, and the flight computer controller 32 and payload controller/mission computer assembly 34 provide agent operational perception, flight, and command and control functionality.

Figure 5:
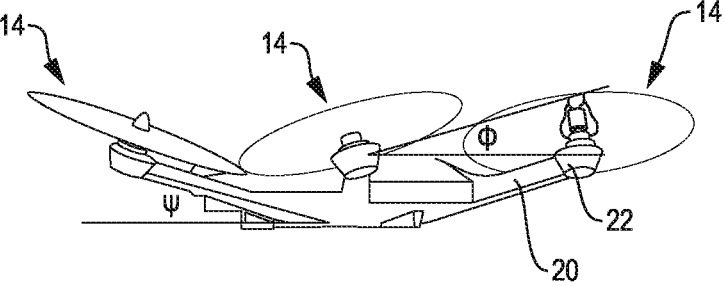
FIG. 5 is a depiction of an alternate embodiment of extended rotor arms in a deployed state representing a fixed compound angular offset relative to rotorcraft main body.

FIG. 5 illustrates the above-referenced angular offsets of the rotors 22. Each arm 20 extends in a slightly forward direction having a non-zero angle $\psi$ relative to the transverse, i.e., relative to a direction perpendicular to the axis of the rotorcraft 10. Additionally, on each arm 20 the rotor 22 is canted about the arm axis at a non-zero angle $\varphi$ from the plane of the arm 20. The angles $\psi$ and $\varphi$ are both preferably in the range of 0 to 45 degrees. This arrangement provides for thrust-vectoring operation using only variable thrust applied to the fixed-position rotors 22.

Figures 6, 7, 8:
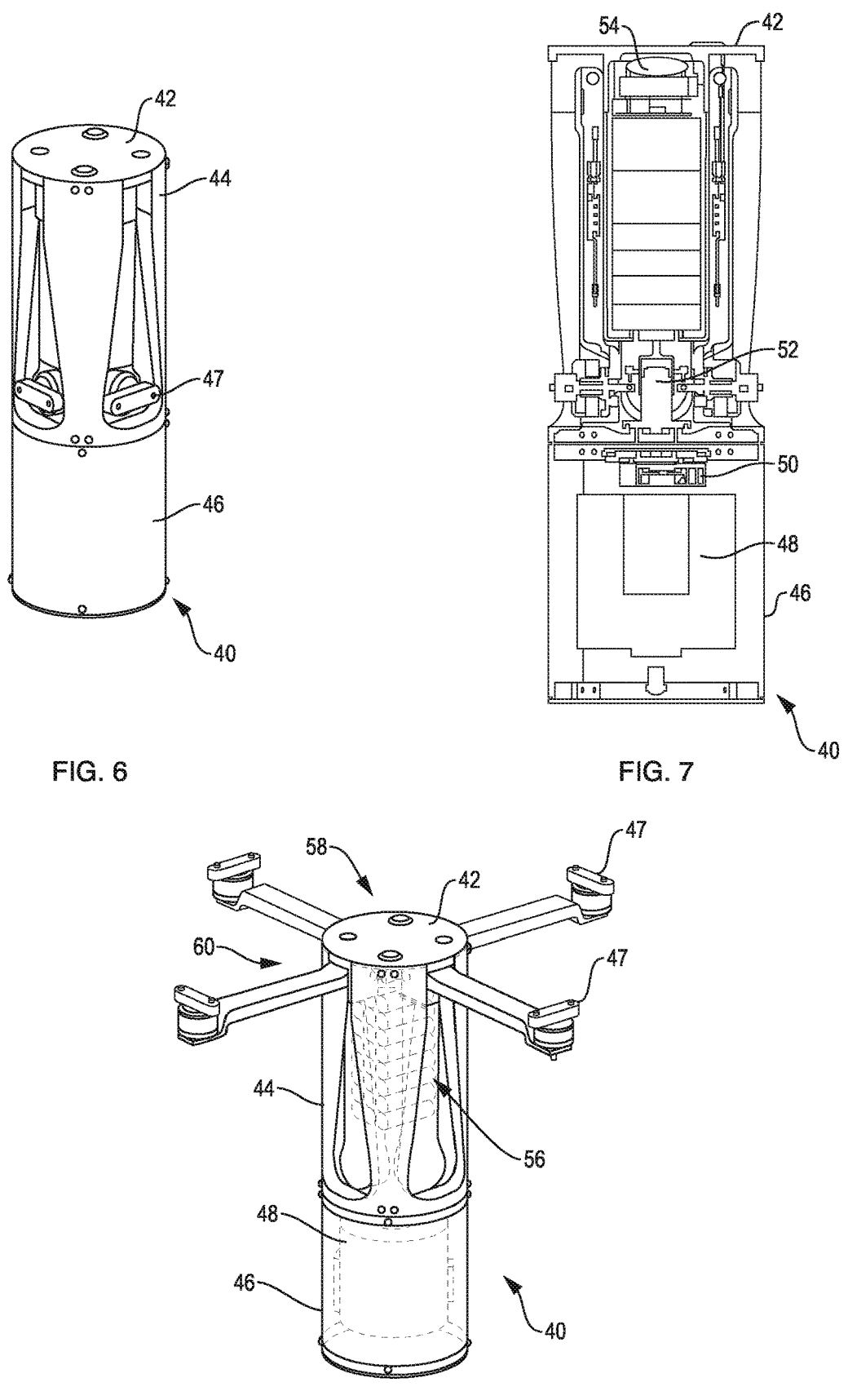
FIG. 6 is a side view of a rotorcraft with a separable modular payload effector compartment according to a second embodiment, in a non-deployed state with rotor arms folded.
FIG. 7 is a side section view of the rotorcraft of FIG. 6 in a non-deployed state.
FIG. 8 is an isometric view of the rotorcraft of FIG. 6 with in a deployed state with rotor arms extended.

FIGS. 6-8 illustrate a rotorcraft 40 according to a second embodiment representing a modular separation of core aircraft and payload subsystems.

As shown in the side view of FIG. 6, the rotorcraft 40 includes a top module 42, a propulsion module 44 and a payload module 46. The rotor-arm assemblies (unnumbered) are folded. For clarity, these views show the rotor hubs 47 without propellers, which are normally present in use.

The section view of FIG. 7 shows an effect 48 (e.g., kinetic or non-kinetic effector) and mission/payload controller 50 in the payload module 46. Also shown is a payload release solenoid 52 used to release the payload module 46 in operation, such as to ground-implant a sensor or to direct an effect to a ground area. Also shown are aircraft subsystem components including a GPS module and power board 54 within the top module 42.

FIG. 8 has outer walls in phantom to reveal internal structure including the effect 48 within the payload module 46, and batteries 56 within the propulsion module 44. A top 58 of the top module 42 has a tactile interface and LED display. Also indicated at 60 is the use of spring assist for rotating the arm-rotor assemblies into the extended positions shown in FIG. 8. Pre-loaded springs affixed to the point of arm-rotor rotation provide adequate clearance to initiate rotor spin without interference of the rotor with the central body or other rotors in proximity.

In the following description the term "agent" is also used to refer more generally to a deployable rotorcraft such as the rotorcraft 10 or the rotorcraft 40. The term "agent" also reflects functional and behavioral aspects of a rotorcraft in use, in particular its participation in a complex activity ("mission") either alone or in combination with other agents/rotorcrafts.

Figure 9:
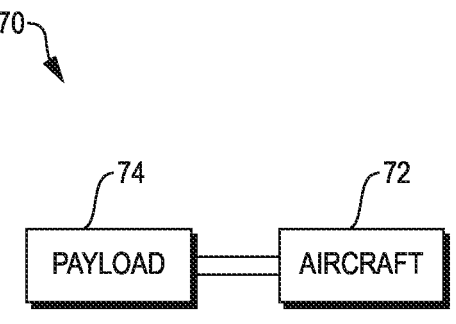
FIG. 9 is a high-level block diagram of a functional organization of the rotorcraft.

FIG. 9 shows an organization of an agent/rotorcraft 70 functionality at a high level, being divided into an aircraft portion 72 and a payload portion 74. It will be appreciated that these functional subsystems 72, 74 are typically packaged or housed accordingly, e.g., the payload portion 74 being housed in the payload module 46 and the aircraft portion 72 in the propulsion module 44 (FIGS. 6-8).

Figure 10:
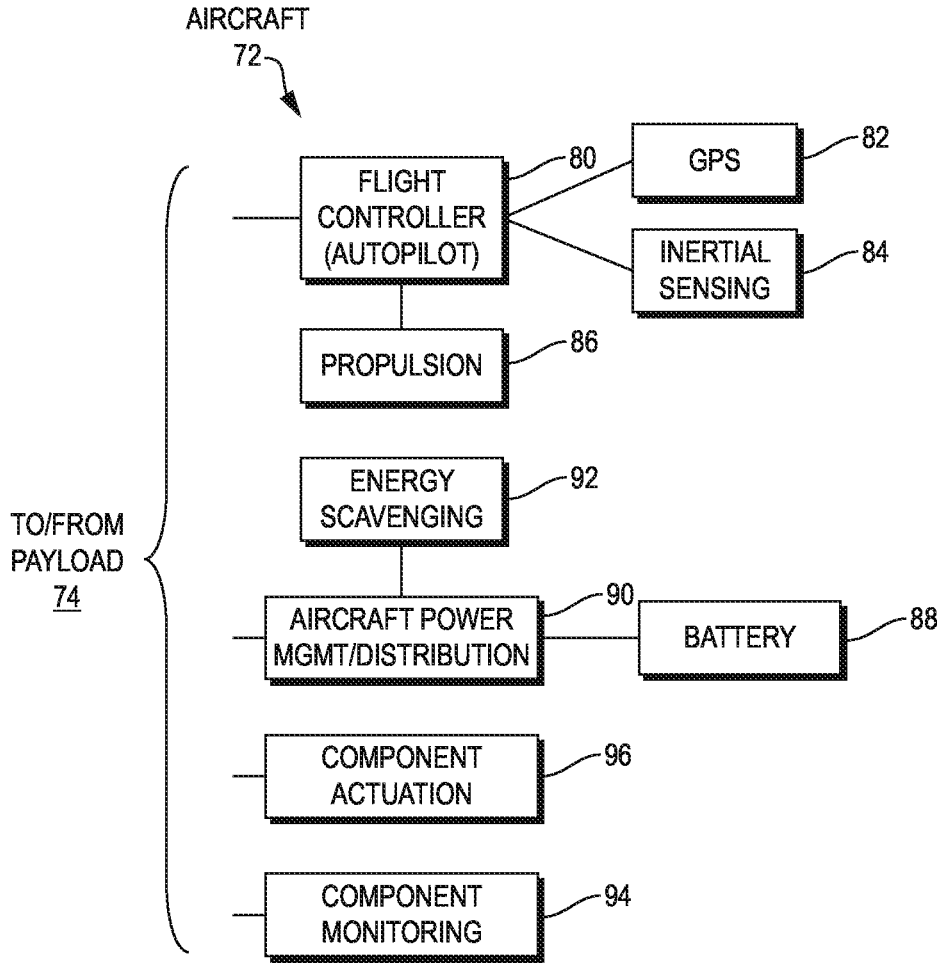
FIG. 10 is a schematic block diagram of functional components of the aircraft part of the rotorcraft.

FIG. 10 shows functional organization of the aircraft portion 72. It includes a flight controller (autopilot) 80 in functional communication with a GPS unit 82, inertial sensing unit 84, and propulsion subsystem 86 (i.e., the rotors such as rotors 22). A power subsystem includes a battery 88, power management and distribution 90, and energy scavenging 92. Also includes are component monitoring functions 94 and component actuation functions 96. As indicated, the flight controller 80, power management/distribution 90, component monitoring 94, and component actuation 96 have functional connections to the payload portion 74, as described in more detail below.

Figure 11:
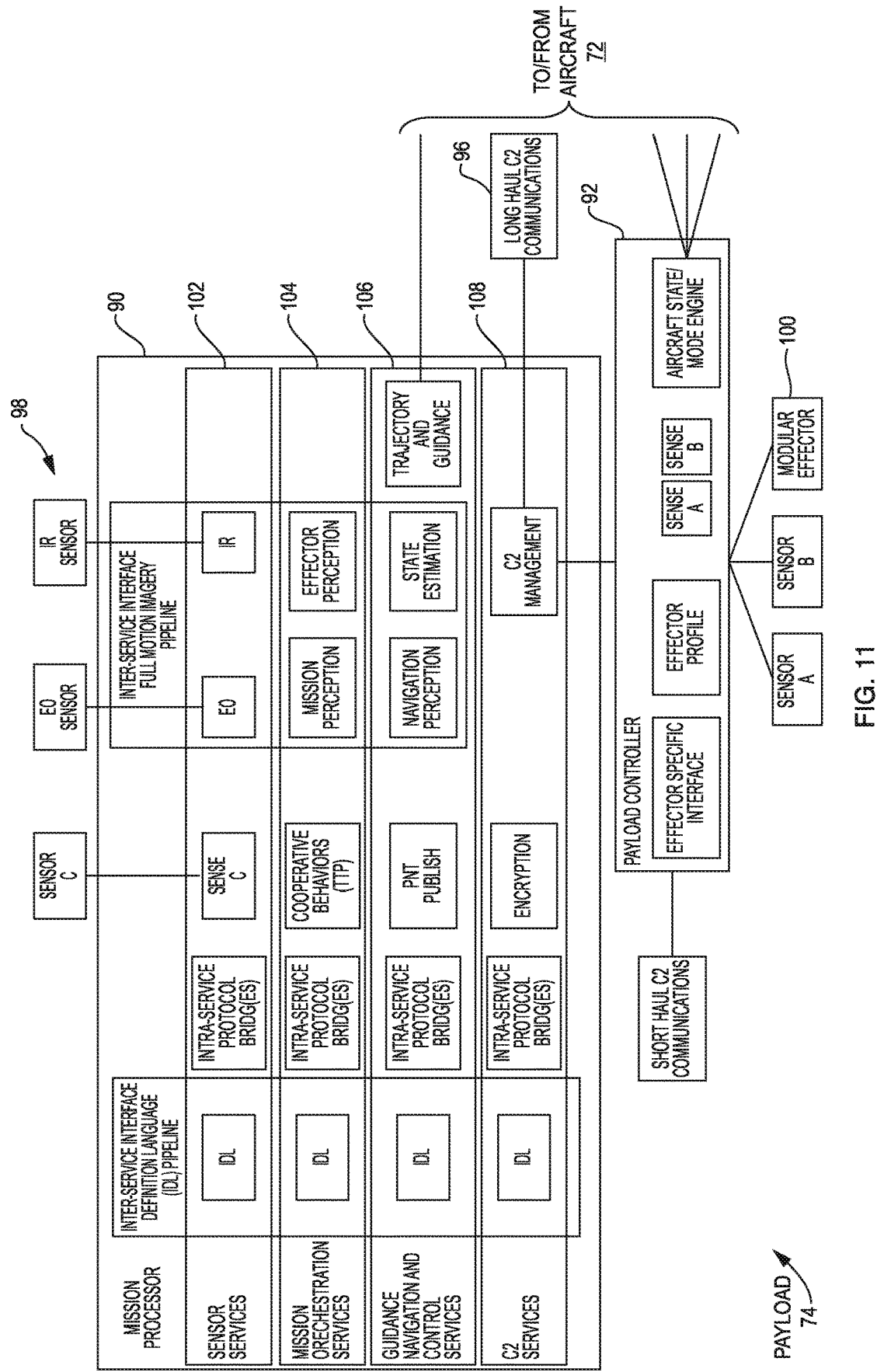
FIG. 11 is a schematic block diagram of functional components of the payload part of the rotorcraft.

FIG. 11 is a schematic block diagram of functional components of the payload subsystem 74. It includes a mission processor 90, payload controller 92, multi-modal communications including short-haul C2 (command and control) communications 94 and long-haul C2 communications 96, sensors 98 including EO and IR sensors as well as additional sensing modalities (SENSOR A, SENSOR B, and SENSOR C), and a modular effector/sensor element 100. The mission processor 90 hosts software-implemented functions which are divided into different classes or types of services including sensor services 102, mission orchestration services 104, guidance/navigation and control services 106, and command and control (C2) services 108. The guidance/navigation and control 106 and the payload controller 92 have functional connections to the aircraft portion 72 as shown at right and noted above with reference to FIG. 10.

The payload controller 92 hosts software functionality that interfaces with aircraft systems to monitor and execute state/mode transitions based on payload controller equipped sensors (SENSOR A and SENSOR B). The payload controller employs SENSOR A and SENSOR B to perceive the environment and utilizes short haul communications 94 to interact with other agents while the remainder of the payload and aircraft remain in a low-power or off state. Based on the equipped modular effect/sensor, the payload controller orchestrates the tailoring of mission and flight control software elements to adapt to the physical, logical, functional, and concept of employment characteristics of the equipped effect/sensor capabilities. Based on the effector profile logical and functional description and SENSOR A and SENSOR B cues, the payload controller aircraft state and mode engine initiates and orchestrates the transition of the aircraft and payload sections to a fully operational state to include the power ON and boot-up of mission processor, EO & IR sensors, additional modalities of sensors as equipped (e.g. SENSOR C) and long haul communications contained within the remainder of the payload section.

Figure 12:
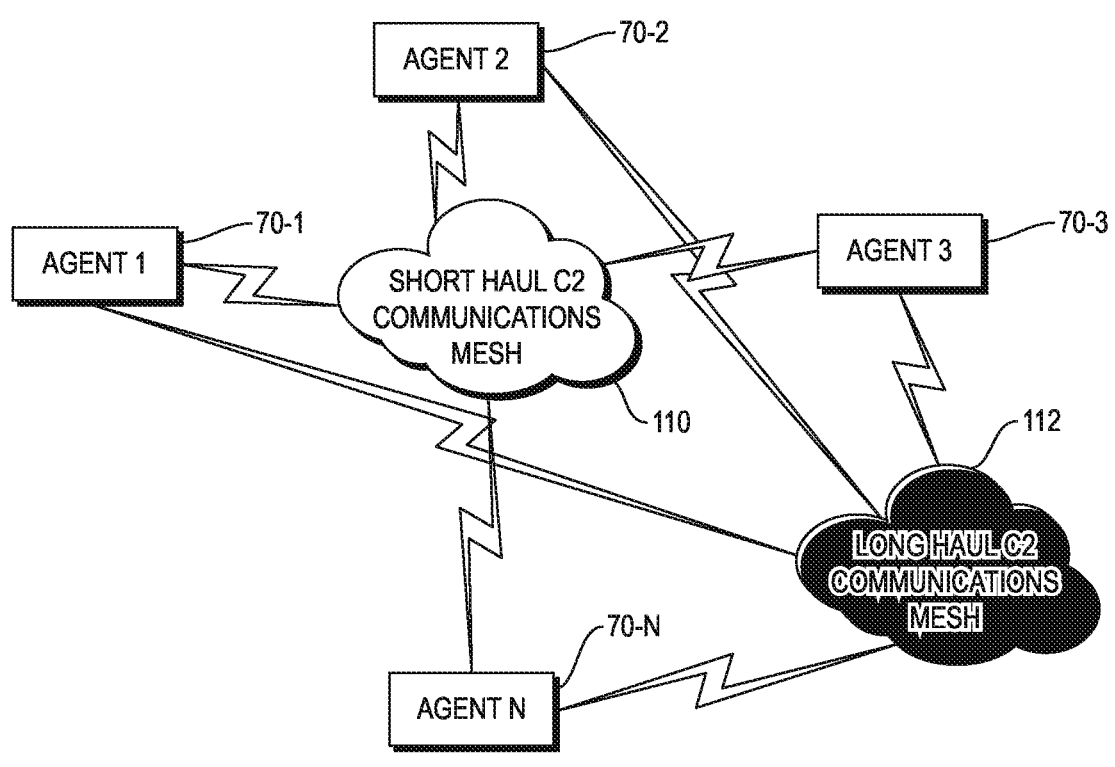
FIG. 12 is a schematic diagram of a communications arrangement in a group of rotorcrafts, shown as "agents"

FIG. 12 illustrates aspects the multi-modal aspect of communications. Each agent 70 has a connection to a short-haul communications mesh 110 that provides for communications among agents 70 of a group (i.e., intra-group communications). Each agent 70 also has connection to a long-haul communications mesh 112 that provides for communications among agents 70 of different groups and with other system elements, e.g., a remote high-level command/control system. The short haul communications may be used in a low-power mode for local agent-to-agent communications. The long haul communications mesh 112 provides higher throughput and longer range data links, for use as needed (e.g., remote tasking, aircraft-to-aircraft agent or agent group-to-group information exchange).

Figure 13:
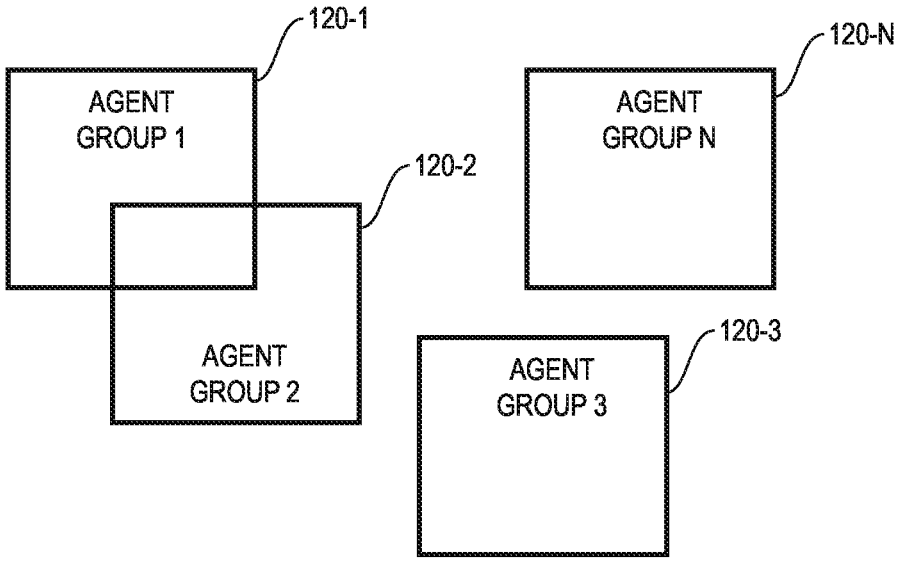
FIG. 13 is a depiction of arrangements of agent groups.

Below are general characteristics of an agent group:
Multiple Agents 1 to N
   a. Each Equipped with a Modular Effect/Sensor
Group of individual Agents comprised of
   a. Homogeneous/Heterogeneous Modular Effects
   b. Low Power Observation
      i. Sensor Modality A
      ii. Sensor Modality B
Low Power Short Haul C2 Communication between
   Agents
   a. E.g. Ultra Wide Band (UWB) Mesh Network
May be ground-emplaced or equipped upon/within a
   delivery vehicle platform FIG. 13 shows an example illustrative deployment scenario. Multiple agent groups 120 can be emplaced, such as agent groups 120-1 to 120-N as shown. "Aggregated" emplacement may be used in which co-location is used to enable the ability to communicate via short haul datalinks in the ground emplaced state. This is indicated by the overlapping groups 120-1 and 120-2. "Disaggregated" emplacement prohibits such an ability to communicate via short haul datalinks during ground emplaced state. This is shown for groups 120-3 and 120-N.

Figure 14:
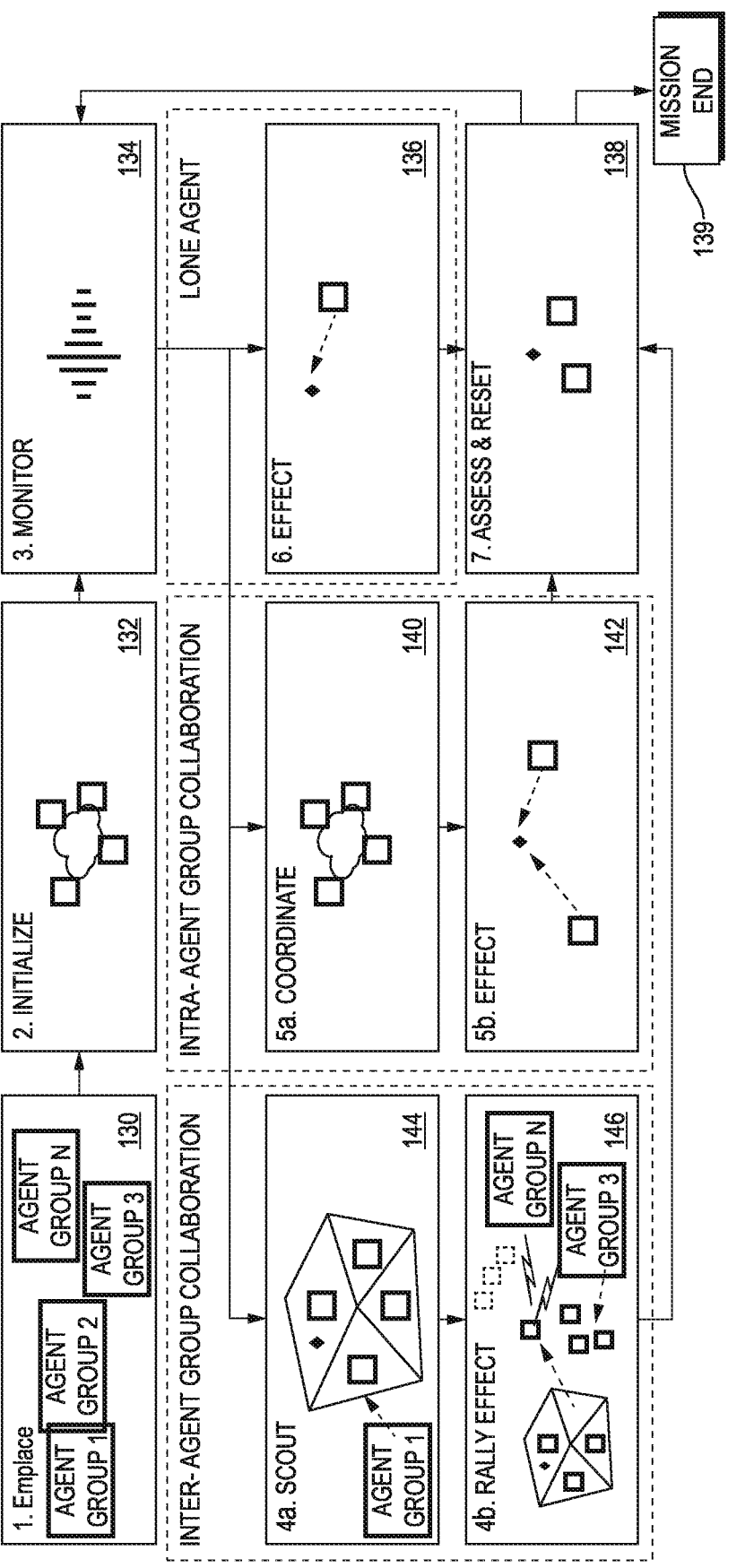
FIG. 14 is a flow diagram of operation of a lone agent, agents in intra-group collaboration, and agents in inter-group collaboration.

FIG. 14 is a high-level mission sequence as follows:
   130: Emplacement of agents 70 arranged in agent groups
      120
   132: Initialization via tactile or remote initiation
   134: Monitoring
   Then for a lone agent:
   136: Activating and conducting a unitary effect response
   138: Assessment and reset
   Conditional Assessment to:
      134: Return to Monitor or;
      Proceed to 139: Mission End
   Then for intra-group collaboration:
   140: Coordinate amongst agents
   142: Activating and conducting a coordinated unitary
      and/or multi-agent effect response
   138: Assessment and reset
   Conditional Assessment to:
      134: Return to Monitor or;
      Proceed to 139: Mission End
   Then for inter-group collaboration:
   144: Scout to assess potential response
   146: Transition to other agent groups to Rally effect
   138: Assessment and reset
   Conditional Assessment to:
      134: Return to Monitor or;
      Proceed to 139: Mission End While various embodiments of the invention have been particularly shown and described, it will be understood by those skilled in the art that various changes in form and details may be made therein without departing from the scope of the invention as defined by the appended claims.

What is claimed is:

1. A tactically deployable rotorcraft for targeted delivery of effects and/or sensors, comprising:
   a body housing an energy subsystem, a propulsion and flight control subsystem, and a payload compartment for holding a mission computer, payload controller, communication components, multi-modal sensors, and a modular effect or sensor payload, the body having a generally cylindrical outline and a plurality of arm-rotor niches in the generally cylindrical outline; and
   a plurality of arm-rotor assemblies pivotably mounted to the body, each arm-rotor assembly including an articulating arm and a rotor at a distal end of the articulating arm, each arm-rotor assembly being pivotable between (1) a closed position in a corresponding arm-rotor niche and within the generally cylindrical outline of the body, and (2) an open position extending from the body with the rotor oriented for controlled and stable flight at relative angular offset to both the body and other coordinated rotors, the rotors being powered by the energy subsystem and controlled by the propulsion and flight control subsystem to provide powered flight of the rotorcraft to a target location for delivery of the effect or sensor payload, the payload controller being capable of automatically adapting and tailoring mission, flight, and autonomous employment characteristic of the rotorcraft based on the equipped effect or sensor payload, wherein, for each of the arm-rotor assemblies in the open position:

the arm of the arm-rotor assembly extends in a forward direction having a non-zero angle $\psi$ relative to a transverse direction perpendicular to an axis of the rotorcraft; and the rotor of the arm-rotor assembly is configured to be canted about an arm axis at a non-zero angle $\varphi$ from a plane of the arm, the angles $\psi$ and $\varphi$ both being in a range of 0 to 45 degrees.

2. The tactically deployable rotorcraft of claim 1, wherein each arm-rotor assembly makes a complete compound angular kinematic motion during extension from closed to open positions, and wherein (1) in the open position each rotor is set at fixed pose relative to a center of the body and coordinated pairs of arm-rotor assembles, and (2) in the open position a position of the rotors reflects a thrust vector that is at a fixed angular offset to the center of the body in at least one degree of freedom.

3. The tactically deployable rotorcraft of claim 1, wherein, at a maximum angle of extension, each of the rotors is oriented relative to a center of the body to deliver thrust both vertically and laterally enabling the ability to translate with reduced center body tilt.

4. The tactically deployable rotorcraft of claim 1, further including, for each of the arm-rotor assemblies, a respective extension mechanism configured and operative to effect the pivoting between the closed and open positions.

5. The tactically deployable rotorcraft of claim 4, wherein each of the extension mechanisms is a passive mechanism.

6. The tactically deployable rotorcraft of claim 5, wherein the passive mechanism employs a spring urging the respective arm-rotor assembly toward the open position.

7. The tactically deployable rotorcraft of claim 4, wherein each of the extension mechanisms is an active mechanism.

8. The tactically deployable rotorcraft of claim 7, wherein the active mechanism includes a solenoid operative to extend the respective rotor arm in response to a control input from the propulsion and flight control subsystem.

9. The tactically deployable rotorcraft of claim 1, further including a multi-modal communications systems enabling remote tasking and aircraft-to-aircraft information exchange.

10. The tactically deployable rotorcraft of claim 1, wherein the energy subsystem includes a power control system with power management enabling power conservation for extended periods of persistence and features providing power scavenging.

11. The tactically deployable rotorcraft of claim 1, wherein the payload compartment provides modular mission payload capability without requiring physical modification to the body, the energy subsystem, and the propulsion and flight control subsystem.

12. The tactically deployable rotorcraft of claim 1, having interfaces and vehicle-to-vehicle networking communications to enable cooperative behaviors among swarms of the rotorcraft using a shared world model/operating picture, and further implement distributed tasking in alignment with predetermined tactics, techniques, and procedures specific to a mission objective with or without human agent oversight.

13. A system for targeted delivery of effects and/or sensors, comprising:

a plurality of tactically deployable rotorcrafts each having an energy subsystem, a control and communications subsystem, a payload compartment for holding an effect or sensor payload, and a plurality of arm-rotor assemblies mounted to a body to present respective rotors in a flight orientation for powered flight of the rotorcraft; and a system controller being co-configured and co-operable with the control and communications subsystems of the rotorcrafts to provide for automated and coordinated thrust-vector maneuvering of the rotorcrafts from respective deployment positions to respective target positions and coordinated delivery of the effects and/or sensors at the respective target positions;

wherein, for each of the arm-rotor assemblies in an open position:

an arm of the arm-rotor assembly extends in a forward direction having a non-zero angle $\psi$ relative to a transverse direction perpendicular to an axis of the rotorcraft; and a rotor of the arm-rotor assembly is configured to be canted about an arm axis at a non-zero angle $\varphi$ from a plane of the arm, the angles $\psi$ and $\varphi$ both being in a range of 0 to 45 degrees.

14. The system of claim 13, wherein the control and communications subsystem of each rotorcraft includes a multi-modal communications systems enabling remote tasking and aircraft-to-aircraft information exchange.

15. The system of claim 13, wherein the energy subsystem of each rotorcraft includes a power control system with power management providing power scavenging and power conservation for extended periods of persistence.

16. The system of claim 13, wherein the payload compartment of each rotorcraft provides modular mission payload capability without requiring physical modification to the body, the energy subsystem, and the control and communications subsystem.

17. The system of claim 13, wherein the control and communications subsystem of each rotorcraft implements interfaces and vehicle-to-vehicle networking communications to enable cooperative behaviors among swarms of the rotorcraft using a shared world model/operating picture, and further implement distributed tasking in alignment with predetermined tactics, techniques, and procedures specific to a mission objective with or without human agent oversight.

18. The tactically deployable rotorcraft of claim 1, wherein the axis of the rotorcraft is a central body axis defined by the body; and wherein, for each of the arm-rotor assemblies in an open position:

the arm of the arm-rotor assembly extends outward from the body in the forward direction having the non-zero angle $\psi$.

* * * * *